United States Patent [19]

Hansen et al.

[11] 3,843,954

[45] Oct. 22, 1974

[54] HIGH-VOLTAGE INTEGRATED DRIVER CIRCUIT AND MEMORY EMBODYING SAME

[75] Inventors: Aage Ansgar Hansen; Ralph David Lane, both of Wappingers Falls, N.Y.

[73] Assignee: International Business Machines Corporation, Armonk, N.Y.

[22] Filed: Dec. 29, 1972

[21] Appl. No.: 319,966

[52] U.S. Cl. .............................. 340/173 R, 307/238
[51] Int. Cl. .............................................. G11c 11/40
[58] Field of Search ................................. 340/173 R

[56] References Cited

UNITED STATES PATENTS

| | | | |
|---|---|---|---|
| 3,286,189 | 11/1966 | Mitchell | 340/173 R |
| 3,363,115 | 1/1968 | Stephenson | 340/173 R |
| 3,364,362 | 1/1968 | Mezlott | 340/173 R |
| 3,373,295 | 3/1968 | Lambert | 340/173 R |
| 3,375,502 | 3/1968 | Shively | 340/173 R |
| 3,518,635 | 6/1970 | Cole | 340/173 R |
| 3,521,141 | 7/1970 | Walton | 340/173 R |

*Primary Examiner*—Terrell W. Fears
*Attorney, Agent, or Firm*—Martin G. Reiffin; Robert J. Haase

[57] ABSTRACT

A high-voltage integrated driver circuit for driving the word lines of a digital computer memory array of floating-gate avalanche-injection transistor memory cells, and for other applications where a high driving voltage is required. The disclosed driver circuit comprises a field-effect output transistor having a source electrode connected to a respective word line, a drain electrode adapted to have a chip select pulse signal applied thereto, and a gate electrode connected to selectably operable circuitry which may be conditioned either to a first state for clamping the voltage of the gate to cut off the output transistor and thereby maintain the output and the word line at a first voltage level, or to a second state for unclamping the voltage of the gate of the output transistor to permit the voltage of the output and the respective word line to swing with a high amplitude so as to cause the selected memory cell transistor to go into avalanche breakdown and thereby charge its floating gate so as to store a bit of information in the selected cell.

20 Claims, 7 Drawing Figures

WRITE OPERATION

READ OPERATION

HIGH-VOLTAGE INTEGRATED DRIVER CIRCUIT AND MEMORY EMBODYING SAME

BACKGROUND OF THE INVENTION

1. Field of the Invention

This invention relates to high-voltage integrated driver circuits for driving the respective word lines of a digital computer memory array of floating gate avalanche-injection transistor cells to cause the latter to undergo avalanche breakdown so as to charge the floating gate of the selected cell and thereby store one bit of information in the latter. Driver circuits in accordance with the present invention may also be utilized in other applications where a high-voltage output swing is required. The present invention also relates to the combination of a memory comprising said driver circuits and an array of said cells.

2. Description of the Prior Art

In the prior art of digital computer memories, there has recently been developed a memory cell comprising a transistor with a floating gate charged by avalanche injection. This type of memory cell is called a "floating-gate avalanche-injection metal oxide semiconductor," otherwise known as a "FAMOS" device. This memory cell is disclosed in U.S. Pat. No. 3,660,819 issued May 2, 1972, and is also disclosed in the paper by D. Frohmann- Bentchkowsky entitled, "A Fully-Decoded 2048-Bit Electrically- Programmable MOS ROM," 1971 IEEE International Solid-State Circuits Conference, February 18, 1971.

This memory cell is electrically programmed by applying a high voltage to the respective word line to cause a PN junction to break down so that charge carriers flow to the floating gate and thereby charge the latter. The cell may thereby store a bit of information whose binary value is indicated by the presence or absence of charge on the floating gate. In order to cause the PN junction to undergo avalanche breakdown, it is necessary to drive the word line with a voltage swing which is relatively large compared to the voltages normally utilized in integrated circuits.

The word line driver circuit heretofore employed in the prior art for this purpose is highly disadvantageous in a vitally important respect. That is, the prior art driver circuit (shown in FIG. 4 of the drawings and described in detail below) also functions as a decoder and comprises a source-follower field-effect transistor connected to the respective word line which is also connected to the drains of a plurality of common-source field-effect transistors. During the WRITE operation a large negative voltage is applied to the gate and drain of the source follower transistors associated with all of the word-lines, both selected and non-selected. Therefore, for the non-selected word-lines, large negative voltages must be applied to the gate of one or more of the common-source transistors to pull the non-selected word-lines up to ground level. As a result, a large current flows through one or more of the common-source transistors of the driver circuits associated with the non-selected word-lines, so as to cause a large power dissipation. The latter is highly disadvantageous in that it permits a duty cycle factor of only about 2 percent during the WRITE operation so as to allow the chip to cool between successive WRITE drive pulses. This substantially reduces the speed of operation of the memory system.

SUMMARY OF THE INVENTION

It is therefore a primary object of the present invention to obviate the above-noted defect of the prior art driver circuit for floating-gate avalanche-injection metal oxide semiconductor (FAMOS) memory cells. The driver circuit in accordance with the present invention dissipates relatively little power as compared with the prior art driver circuit, and permits a duty cycle factor of 100 percent during the WRITE operation. As a result, a memory embodying the driver circuit of the present invention may execute a series of WRITE operations at a very much faster rate than heretofore possible in the prior art memories utilizing the floating-gate avalanche-injection cell. The present invention achieves this object by eliminating all high-power direct-current paths associated with the non-selected driver circuits during the WRITE operation.

Another important advantage of the present invention is that the output transistor which drives the word-line is protected against avalanche breakdown by a circuit arrangement which maintains its gate at ground voltage when the driver circuit is non-selected during the WRITE operation.

A further important advantage of the present invention is that the decode cross-point transistor associated with each floating-gate avalanche-injection transistor is protected against avalanche breakdown by maintaining the word line at ground voltage in the non-selected driver circuits during the WRITE operation.

Other objects and advantages of the present invention are inherent in the structure disclosed in the drawings and described below and/or will become apparent to those skilled in the art as the detailed description proceeds.

"FAMOS" MEMORY CELL

Figure 1:
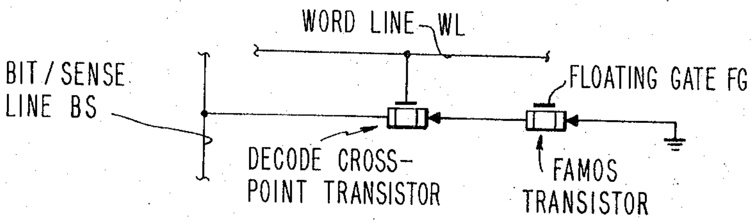
FIG. 1 PRIOR ART
FIG. 1 is a schematic circuit diagram of a single memory cell including a decode transistor and a floating-gate avalanche-injection transistor in accordance with the prior art.
Figure 2:
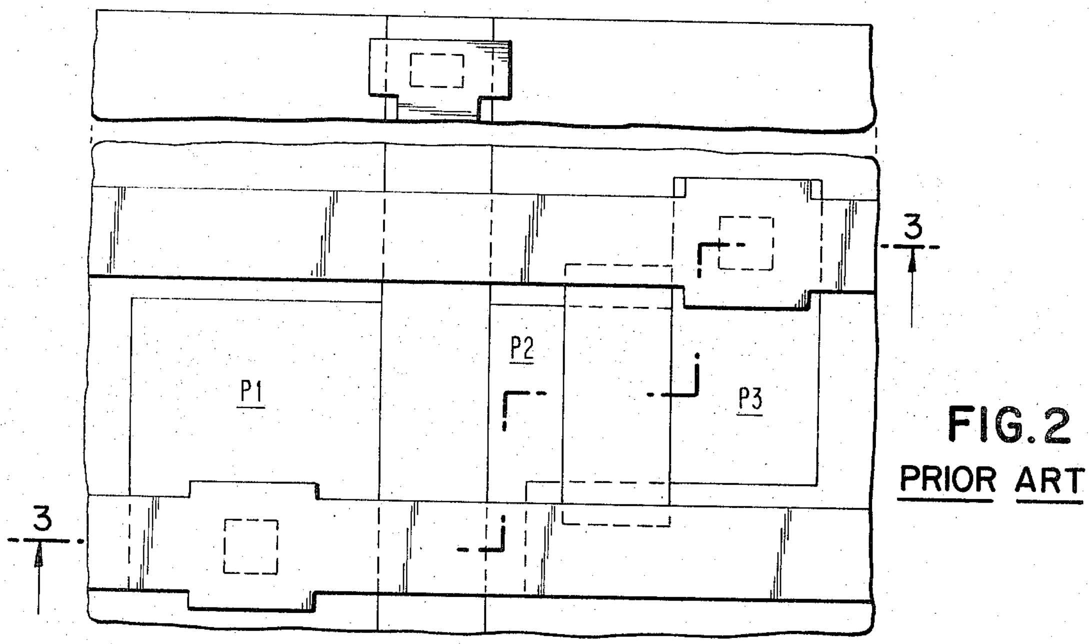
FIG. 2 PRIOR ART
FIG. 2 is a plan view of a portion of an integrated circuit memory array embodying floating-gate avalanche-injection memory cells in accordance with the prior art.
Figure 3:
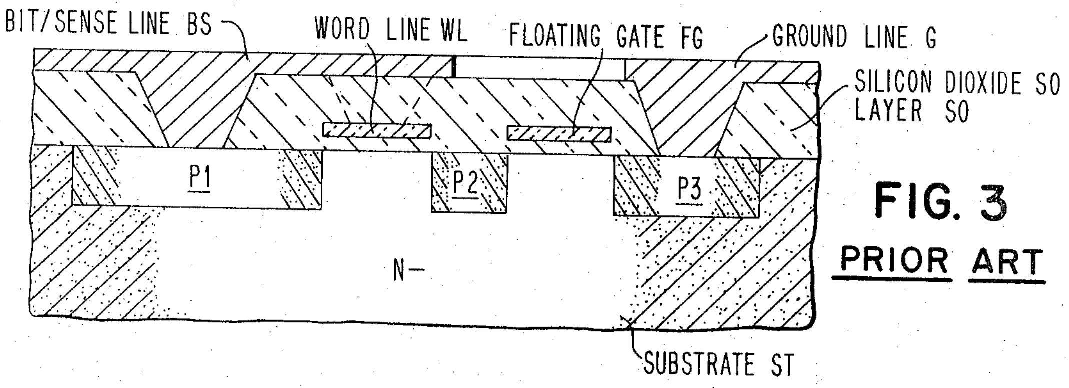
FIG. 3 PRIOR ART
FIG. 3 is a transverse sectional view taken substantially on line 3—3 of FIG. 2.

The structure and operation of the floating-gate avalanche-injection metal oxide semiconductor ("FAMOS") memory cell are disclosed in said patent and said paper referenced above and will be only briefly described with respect to FIGS. 1 to 3 of the present drawings.

Referring first to FIG. 1, there is shown a schematic circuit diagram illustrating a single memory cell comprising a decode (or "cross-point") transistor and a floating-gate avalanche-injection metal oxide semiconductor (or "FAMOS") transistor. The source of the decode transistor is shown connected to the drain of the FAMOS transistor although in actual practice the source and drain are embodied in a single diffusion region. The drain of the decode transistor is connected to a bit/sense line BS and the gate of the decode transistor is connected to a respective word line WL. The floating gate FG of the FAMOS transistor is unconnected and insulated, and the source of the FAMOS transistor is connected to ground.

Referring now to FIGS. 2 and 3, there is shown a portion of an integrated circuit array of FAMOS memory cells and including the structure of a complete cell. The substrate ST is of $N^-$ conductivity type and has formed therein adjacent its upper surface three P-type regions P1, P2, P3. Region P1 is the drain of the decode or cross-point transistor, region P3 is the source of the FAMOS transistor, and region P2 serves as both the source of the decode transistor and the drain of the FAMOS transistor. The respective bit/sense line BS is in ohmic contact with region P1 and ground line G is in ohmic contact with region P3. The reference designation DG indicates the gate of the decode transistor, and the reference designation FG indicates the floating gate of the FAMOS transistor. It will be seen that floating gate FG is electrically isolated within a silicon dioxide layer SO.

The operation of the prior art memory cell shown in FIGS. 1 to 3 will now be briefly described, reference being made to said patent and said paper for further details. In order to perform the WRITE operation so as to store a charge on floating gate FG, a large negative voltage of about 30 volts is applied to both bit/sense line BS and word-line WL connected to the selected cell. A P-type inversion channel is thereby formed adjacent the upper surface of substrate ST between regions P1 and P2 so that the decode transistor conducts and a large reverse-bias voltage is applied to the junction between region P2 and substrate ST. This reverse bias-voltage causes the junction to break down so as to generate high energy electrons in the depletion region of the junction. These electrons then diffuse through the portion of silicon dioxide layer SO immediately beneath floating gate FG so as to charge the latter. After the negative voltage is removed from bit/sense line BS and word-line WL, the charge remains stored on floating gate FG, and the WRITE operation is complete. During the READ operation, the presence or absence of a stored charge on floating gate FG is determined so as to indicate whether a logical "1" or "0" is stored in the cell.

PRIOR ART DRIVER CIRCUIT

Figure 4:
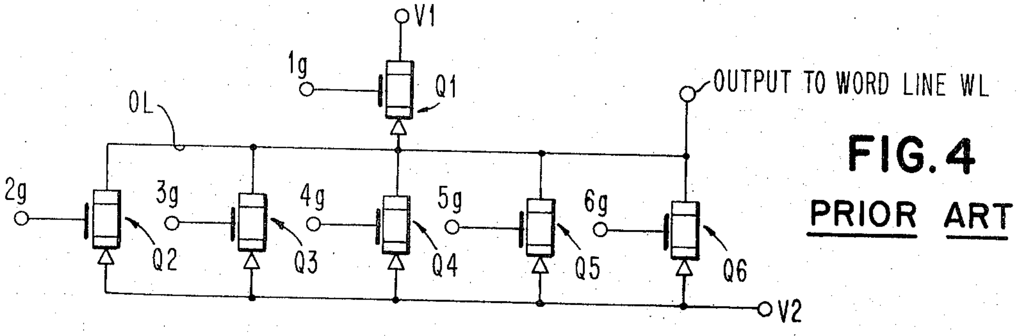
FIG. 4 PRIOR ART
FIG. 4 is a schematic circuit diagram showing the prior art driver circuit heretofore employed for driving the word-lines of the floating-gate avalanche-injection memory cells shown in FIGS. 1 to 3.

Referring now to FIG. 4, there is shown the driver circuit heretofore employed in the prior art for driving word-line WL to a large negative voltage so as to induce avalanche breakdown of the FAMOS memory cell. More specifically, the prior art driver circuit comprises a source-follower field-effect transistor Q1 having its drain connected to a negative voltage source V1 and its source connected to the output line OL in turn connected to the output extending to word line WL. A plurality of common-source field-effect transistors Q2, Q3, Q4, Q5, Q6 have their respective drains connected to output line OL and their respective sources connected to a voltage source V2 positive with respect to voltage source V1. The potential of voltage source V2 may be at ground level. A plurality of inputs are connected to the respective gates *1g* to *6g* of transistors Q1 to Q6.

In order to select a particular cell for avalanche injection during the WRITE operation, output line OL must be driven to a large negative voltage. This is accomplished by applying a negative voltage to gate *1g* of transistor Q1 to render transistor Q1 conductive, while simultaneously applying signals to gates *2g* to *6g* to cut off transistors Q2 to Q6. The voltage of word line WL goes negative to select this particular word line. However, for non-selection of this particular word line WL, its potential must be maintained substantially at the potential of voltage source V2, usually at ground level. This is accomplished by a negative signal applied to one or more of gates *2g* to *6g* to turn on one or more of transistors Q2 to Q6. The conductive common-source transistor or transistors Q2 to Q6 will thus hold the voltage of output line OL up to approximately the voltage of source V2, that is, at ground level.

The prior art driver circuit of FIG. 4 has a serious disadvantage for the non-select condition during the WRITE operation. That is, a large negative voltage is applied to the gate and drain of the source follower transistor Q1 and also to the gates of one or more of common-source transistors Q2 to Q6. As a result, a large current flows through transistor Q1 and through those of common-source transistors Q2 to Q6 which are conductive, thereby causing a large power dissipation. The latter is highly disadvantageous in that it permits a duty cycle factor of only about 2 percent during the WRITE operation. This low duty cycle factor is necessary to allow the chip to cool between successive WRITE drive pulses. As a result, the time of execution of a succession of WRITE operations is substantially increased so as to reduce the speed of operation of the memory system.

DESCRIPTION OF THE PREFERRED EMBODIMENT

Structure of the Driver Circuit

Figure 5:
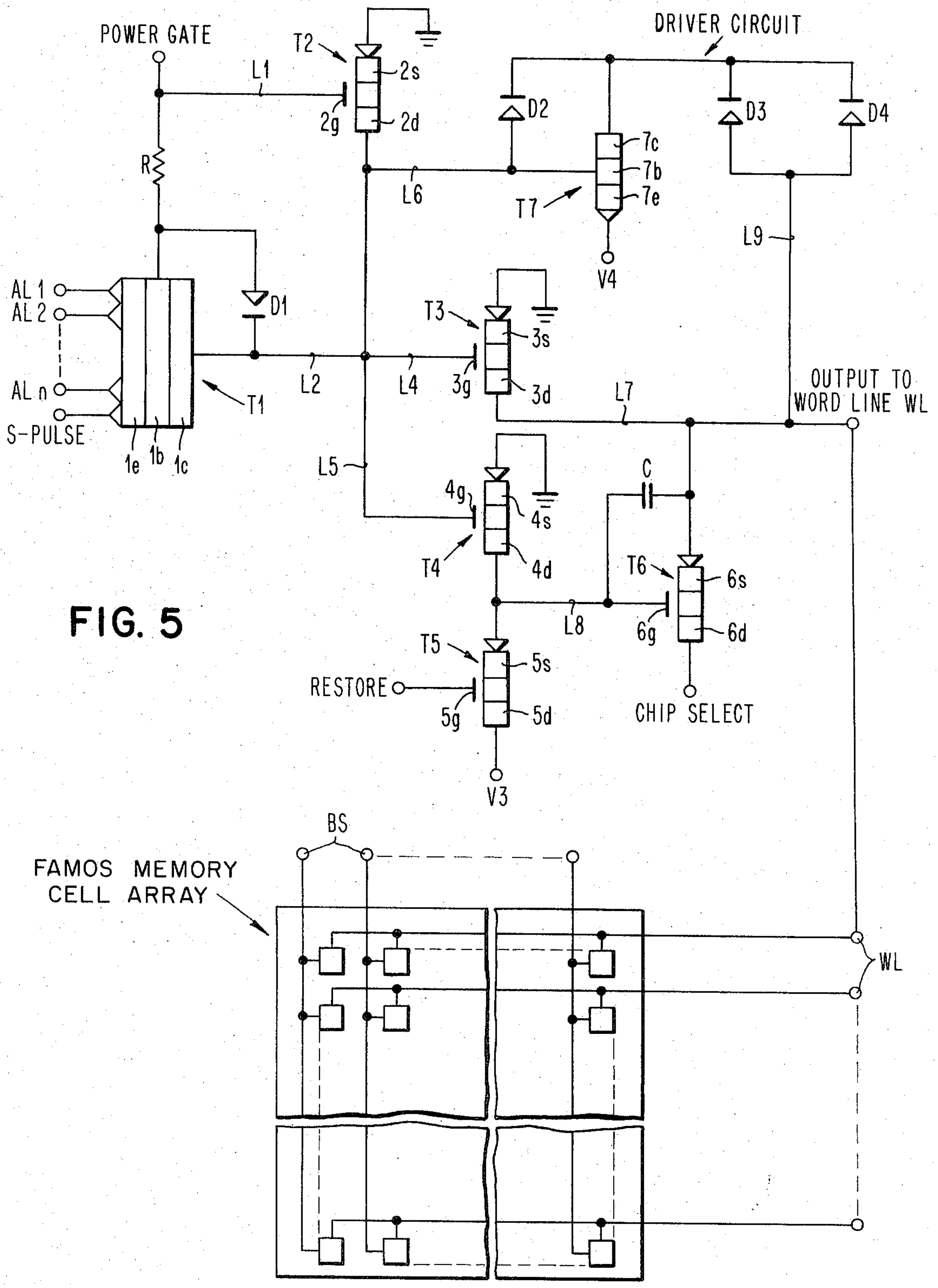
FIG. 5 is a schematic circuit diagram showing a preferred embodiment of a driver circuit in accordance with the present invention and connected to a particular word line of a memory cell array.

Referring to FIG. 5, the structure of the novel driver circuit in accordance with the present invention will now be described. A bipolar transistor T1 is provided with a plurality of emitters *1e*. One of the emitters *1e* is connected to an S-pulse input line. The remaining emitters *1e* are connected to the respective address line inputs AL, AL2, ...AL*n*. Base *1b* of transistor T1 is connected to the anode of a diode D1, preferably of the Schottky barrier type. The cathode of diode D1 is connected to collector *1c* of transistor T1 and also to a lead L2.

A resistor R has its lower end connected to base *1b* of transistor T1 and its upper end connected to a Power Gate signal input. Also connected to the latter through a lead L1 is the gate *2g* of a P-channel field-effect transistor T2. The source *2s* of the latter is connected to ground and its drain *2d* is connected to the junction of leads L3 and L6. The other end of lead L3 is connected to the junction of leads L2, L4, L5. Lead L4 extends to the gate *3g* of a P-channel field-effect transistor T3 having its source *3s* connected to ground and its drain *3d* connected through lead L7 to the output of the driver circuit which is connected to a respective one of the word-lines WL in the memory cell array.

The other end of lead L5 is connected to the gate 4*g* of a P-channel field-effect transistor T4 having its source 4*s* connected to ground and its drain 4*d* connected to the source 5*s* of a P-channel field-effect transistor T5. The gate 5*g* of the latter is connected to a Restore signal input. Drain 5*d* of transistor T5 is connected to a negative voltage source V3. Drain 4*d* of transistor T4 and source 5*s* of transistor T5 are connected by a lead L8 to the gate 6*g* of a P-channel field-effect output transistor T6. The source 6*s* of the latter is connected through lead L7 to the driver circuit output and its drain 6*d* is connected to a Chip Select signal input. A positive-feedback bootstrapping capacitor C is connected between source 6*s* and gate 6*g* of transistor T6.

Drain 2*d* of transistor T2 and lead L3 are connected by lead L6 to the base 7*b* of a bipolar transistor T7. The emitter 7*e* of the latter is connected to a negative voltage source V4 of −5 volts, only during the READ operation, whereas during the WRITE operation emitter 7*e* of transistor T7 is unconnected and its voltage is permitted to "float." There are also provided two diodes D2 and D3, preferably of the Schottky barrier type, and a third diode D4 of the conventional diffused junction type. The cathodes of all three diodes D2, D3, D4 are connected to collector 7*c* of transistor T7. The anodes of diodes D3 and D4 are connected by a lead L9 to the driver circuit output which is connected to a respective word-line WL of the memory cell array. The anode of D2 is connected to the base 7*b* of transistor T7. The latter is shown schematically in FIG. 5.

OPERATION OF THE DRIVER CIRCUIT

WRITE Operation for a Selected Circuit

Figure 6:
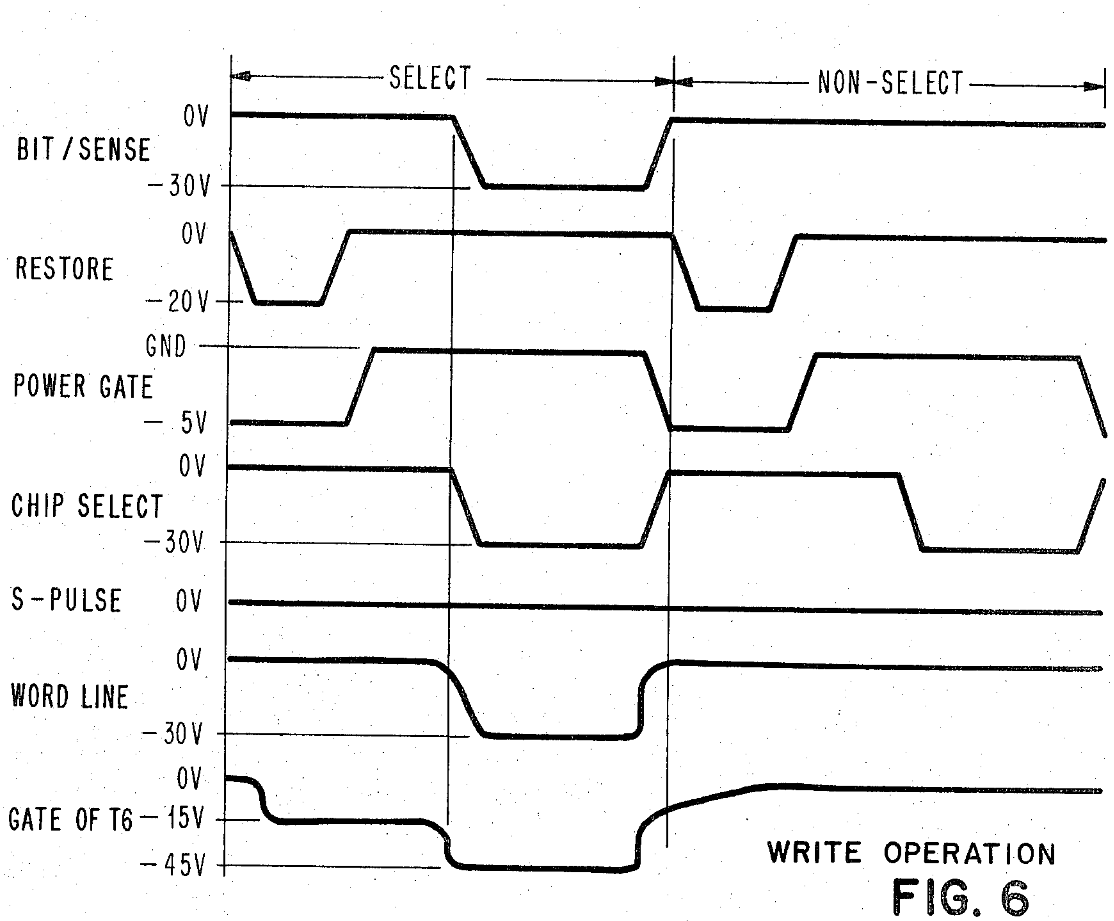
FIG. 6 shows the various voltage levels during the WRITE operation.
Figure 7:
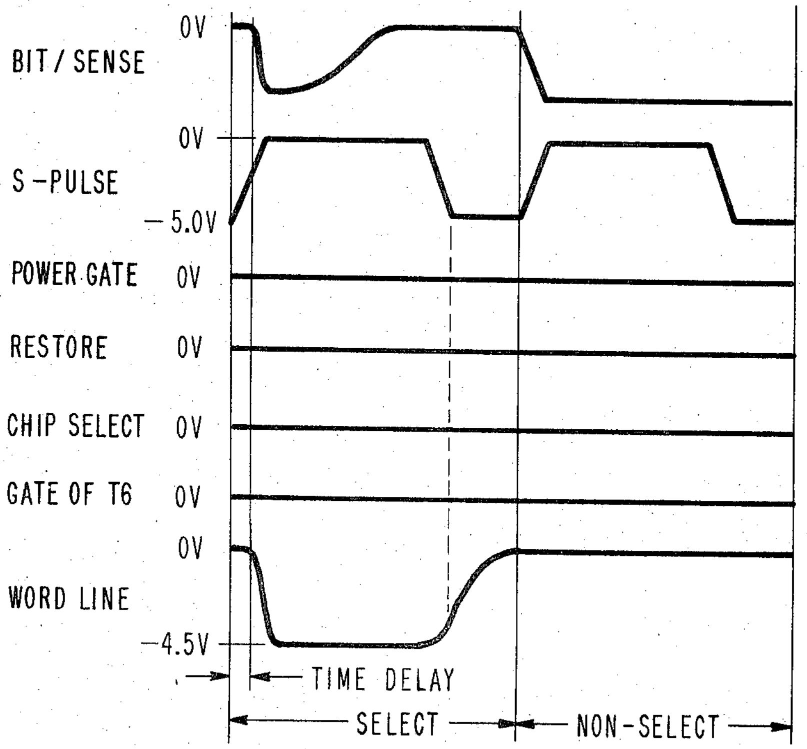
FIG. 7 shows the various voltage levels during the READ operation.

The operation of a selected circuit during the WRITE operation will now be described with respect to the circuit diagram of FIG. 5 and the signal diagram of FIGS. 6 and 7. The S-pulse signal remains up at ground voltage level throughout this operation. The emitter 7*e* of transistor T7 is not connected to voltage source V4 and floats throughout this cycle of operation. The Restore input voltage goes down to −20 volts, thereby turning on transistor T5. As a result, gate 6*g* of transistor T6 is pulled downwardly to −15 volts. The voltage at the Restore input then returns upwardly to ground voltage to cut off transistor T5. However, gate 6*g* of transistor T6 is allowed to float at −15 volts. By this time the signals at the address line inputs AL1 to ALn are valid; that is, for the circuit to be selected the voltages at all of these inputs are up at ground level. The voltage at the Power Gate input then rises to ground level, thereby cutting off transistor T2. Gate 3*g* of transistor T3 and gate 4 *g* of transistor T4 remain at ground voltage. Therefore transistors T3 and T4 are cut off.

The voltage at the Chip Select input then goes down to −30 volts. Since gate 6*g* of transistor T6 was left floating at −15 volts, as described above, transistor T6 is rendered conductive and the voltage of source 6*s* swings downwardly, thereby transmitting a positive feedback signal through capacitor C to gate 6*g* so as to drive transistor T6 heavily into the conductive state. The voltage of gate 6*g* drops rapidly to about −45 volts and the voltage of source 6*s* and hence the driver circuit output swings rapidly down to −30 volts thereby driving word line WL to cause avalanche injection of the selected memory cell and the storage of charge on its floating gate. The voltage at the Chip Select input then returns up to ground level and transistor T6 undergoes inverse operation. That is, source 6*s* functions as a drain and drain 6*d* functions as a source, so that the driver circuit output and word line WL connected thereto are pulled upwardly to ground voltage. The voltage at the Power Gate input then drops to −5 volts and the WRITE cycle of operation for a selected circuit is complete.

WRITE Operation for a Nonselected Circuit

The WRITE operation for a nonselected circuit will now be described with reference to FIGS. 5 to 7. As noted above, the emitter 7*e* of transistor T7 is not connected to voltage source V4 and remains floating throughout this cycle of operation. The voltage at the S-pulse input rises to ground level. The voltage at the Restore input goes negative to −20 volts, thereby turning on transistor T5 and pulling the voltage of gate 6*g* of transistor T6 down to −15 volts. The voltage at the Restore input then rises to ground level and the voltage of gate 6*g* is allowed to float at −15 volts after transistor T5 is cut off. At this time the voltages at address lines AL1 to AL*n* are valid; that is, for a nonselected circuit one or more of these address lines is at a negative voltage of −5 volts.

The voltage at the Power Gate input then rises to ground level, thereby cutting off transistor T2 and turning on transistor T1. The voltage at base 1*b* of transistor T1 is at −4.2 volts. Gates 3*g*, 4*g* of transistors T3, T4 are at −4.8 volts, thereby turning on these transistors. Since transistor T3 is conductive, its drain 3*d* and hence also the driver circuit output remain at ground voltage. Since transistor T4 is conductive, current flows therethrough to gate 6*g* of transistor T6 to maintain gate 6*g* at ground voltage. This prevents avalanche breakdown of transistor T6 when the voltage at the Chip Select input goes down to −30 volts. When this occurs, word line WL still remains at ground voltage because transistor T3 is conductive. Hence, the FAMOS memory cell to which the particular word line WL is connected does not undergo avalanche injection and its floating gate is not charged. The voltage at the Chip Select input then rises to ground voltage and the voltage at the Power Gate input drops to −5 volts. Transistor T2 is turned on. Gates 3*g*, 4*g* discharge to ground potential, and transistors T3, T4 are cut off to complete the cycle of operation.

READ Operation for a Selected Circuit

The READ operation for a selected circuit will now be described with reference to FIGS. 5 to 7. Emitter 7*e* of transistor T7 is connected to voltage source V4 at −5 volts. The Restore, Chip Select and Power Gate inputs remain at ground voltage throughout this cycle of operation. Transistors T5, T6 remain cut off throughout this cycle of operation. No current flows through transistor T4 because its drain 4*d* is at ground voltage. The signals at all of the address line inputs AL1 to ALn are now valid at ground voltage. The voltage at the S-pulse input rises to ground level. Therefore, the base-emitter junction of transistor T1 is reverse-biased and transistor T1 is cut off. Current flows from the Power Gate input downwardly through resistor R, diode D1, leads L2, L3, L6 and to base 7*b* of transistor T7, thereby turning the latter on. As a result, the voltage of collector 7*c* of transistor T7 drops to −4.8 volts rendering diodes D3 and D4 conductive so as to pull down wordline WL to −4.3 volts. The voltage at the S-pulse input then drops to −5 volts to turn transistor T1 on. Collector 1*c* of transistor T1 pulls the voltage of gate 3*g* of transistor T3 and base 7*b* of transistor T7 downwardly to −4.8 volts, thereby cutting off transistor T7 and turning on transistor T3. The conductive state of the latter pulls lead L7 and the driver circuit output along with word line WL up to ground voltage, and the cycle of operation is complete.

READ Operation for a Nonselected Circuit

The operation of a nonselected driver circuit during a READ cycle will now be described with reference to FIGS. 5 to 7. Emitter 7*e* of transistor T7 is connected to voltage source V4 at −5 volts. The voltages at the Restore, Power Gate and Chip Select inputs remain at ground level throughout this cycle. Transistors T5, T6 remain cut off. No current flows through transistor T4 because its drain 4*d* is at ground potential. When address lines AL1 to ALn are valid for the nonselected condition, one or more of these address line inputs is at −5 volts. The voltage at the S input rises to ground level. Because one or more of the address lines AL1 to AL*n* are at −5 volts, T1 remains ON. Collector 1*c* of conductive transistor T1 and base 7*b* of transistor T7 remain at −4.8 volts thereby keeping transistor T7 cut off. Gate 3*g* of transistor T3 is also at −4.8 volts, and hence maintains word line WL at ground level. The S-pulse input drops to −5 volts to complete the cycle of operation.

CLAIMS

It will be understood that the specific embodiment shown in the drawings and described above is merely illustrative of one of the many forms which the invention may take in practice and that numerous modifications and variations thereof will readily occur to those skilled in the art without departing from the scope of invention which is delineated in the appended claims, and that the claims are to be construed as broadly as permitted by the prior art.

We claim:

1. A high voltage integrated driver circuit comprising:

a transistor having a first conductive electrode, a second conductive electrode, and a control electrode, an output connected to said first conductive electrode, means for applying a signal pulse of a predetermined polarity to said second conductive electrode, and selectably operable means conditioned either to a first state for clamping the voltage of said control electrode to cut off said transistor and thereby to maintain said first conductive electrode and said output at a first predetermined voltage level, or to a second state for unclamping the voltage of said control electrode to permit the voltage of said first conductive electrode to swing in the direction of said predetermined polarity in response to said signal pulse, said selectably operable means comprising a second transistor having a third conductive electrode, a fourth conductive electrode, and a second control electrode, a fixed potential source, means connecting said third conductive electrode to said fixed potential source so as to maintain said third conductive electrode at said fixed potential, means connecting said fourth conductive electrode to said first-recited control electrode so as to maintain said fourth conductive electrode and said first-recited control electrode at the same potential, and means for selectably applying a signal to said second control electrode to render said second transistor either conductive or non-conductive.

2. A high-voltage integrated driver circuit is recited in claim 1 wherein said first-recited transistor and said second transistor are field-effect transistors, said first and third conductive electrodes are source electrodes, said second and fourth conductive electrodes are drain electrodes, and said control electrodes are gate electrodes.

3. A high-voltage integrated driver circuit as recited in claim 1 and comprising means for applying a restore pulse to charge said control electrode to an initial voltage level before activation of said signal pulse applying means.

4. A high-voltage integrated driver circuit as recited in claim 1 and comprising positive feedback means connecting said first conductive electrode to said control electrode.

5. A high-voltage integrated driver circuit as recited in claim 4 wherein said positive feedback means comprises a capacitor.

6. A high voltage integrated driver circuit comprising:

a transistor having a first conductive electrode, a second conductive electrode, and a control electrode, an output connected to said first conductive electrode, means for applying a signal pulse of a predetermined polarity to said second conductive electrode, and selectably operable means conditioned either to a first state for clamping the voltage of said control electrode to cut off said transistor and thereby to maintain said first conductive electrode and said output at a first predetermined voltage level, or to a second state for unclamping the voltage of said control electrode to permit the voltage of said first conductive electrode to swing in the direction of said predetermined polarity in response to said signal pulse, said selectably operable means comprising a second transistor having a third conductive electrode, a fourth conductive electrode, and a second control electrode, a fixed potential source, means connecting said third conductive electrode to said fixed potential source, means connecting said fourth conductive electrode to said first-recited control electrode, and means for selectably applying a signal to said second control electrode to render said second transistor either conductive or non-conductive comprising a logic gate having a plurality of inputs adapted to receive binary signals.

7. A high-voltage integrated driver circuit as recited in claim 6 wherein said first-recited transistor and said second transistor are field-effect transistors, said first and third conductive electrodes are source electrodes, said second and fourth conductive electrodes are drain electrodes, and said control electrodes are gate electrodes.

8. A high-voltage integrated driver circuit as recited in claim 2 and comprising means for applying a restore pulse to charge said first control electrode to an initial voltage level before activation of said signal pulse applying means.

9. A high-voltage integrated driver circuit as recited in claim 8 and comprising positive feedback means connecting said first conductive electrode to said first control electrode.

10. A high-voltage integrated driver circuit as recited in claim 9 wherein said positive feedback means comprises a capacitor.

11. A high-voltage integrated driver circuit as recited in claim 10, wherein said logic gate comprises a transistor having a plurality of electrodes, each of said inputs being connected to a respective one of said logic gate transistor electrodes.

12. A high-voltage integrated driver circuit as recited in claim 11, wherein said logic gate transistor is a bipolar transistor, each of said plurality of electrodes being an emitter electrode.

13. A high-voltage integrated driver circuit as recited in claim 12 wherein said selectably operable means comprises a third transistor having a fifth conductive electrode, a sixth conductive electrode, and a third control electrode, means connecting said fifth conductive electrode to a fixed potential source, means connecting said sixth conductive electrode to said output, and means connecting said third control electrode to said means for selectably applying a signal so as to render said third transistor either conductive or non-conductive.

14. A memory system for digital computers and other digital equipment and comprising an array of memory cells arranged in a plurality of rows, each memory cell including a floating-gate avalanche-injection transistor, a plurality of word-lines each connected to a respective row of said memory cells, each of said word-lines having associated therewtih a respective driver circuit as recited in claim 6, each of said driver circuit outputs being drivingly connected to the respective word-line.

15. A memory system for digital computers and other digital equipment and comprising an array of memory cells arranged in a plurality of rows, each memory cell including a floating-gate avalanche-injection transistor, a plurality of word-lines each connected to a respective row of said memory cells, each of said word-lines having associated therewtih a respective driver circuit as recited in claim 13, each of said driver circuit outputs being drivingly connected to the respective word-line, said array of memory cells and said driver circuits associated therewith being embodied in a single monolithic integrated circuit chip.

16. A high voltage integrated driver circuit comprising:

a transistor having a first conductive electrode, a second conductive electrode, and a control electrode, an output connected to said first conductive electrode, means for applying a signal pulse of a predetermined polarity to said second conductive electrode, and selectably operable means conditioned either to a first state for clamping the voltage of said control electrode to cut off said transistor and thereby to maintain said first conductive electrode and said output at a first predetermined voltage level, or to a second state for unclamping the voltage of said control electrode to permit the voltage of said first conductive electrode to swing in the direction of said predetermined polarity in response to said signal pulse, said selectably operable means comprising a second transistor having a third conductive electrode, a fourth conductive electrode and a second control electrode, a fixed potential source, means connecting said third conductive electrode to said fixed potential source, means connecting said fourth conductive electrode to said first-recited control electrode, means for selectably applying a signal to said second control electrode to render said second transistor either conductive or non-conductive, a third transistor having a fifth conductive electrode, a sixth conductive electrode, and a third control electrode, means connecting said fifth conductive electrode to a fixed potential source, means connecting said sixth conductive electrode to said output, and means connecting said third control electrode to said means for selectably applying a signal so as to render said third transistor either conductive or non-conductive.

17. A high-voltage integrated driver circuit as recited in claim 16 wherein said first-recited transistor, said second transistor and said third transistor are field-effect transistors, said first, third and fifth conductive electrodes are source electrodes, said second, fourth and sixth conductive electrodes are drain electrodes, and said control electrodes are gate electrodes.

18. A memory system for digital computers and other digital equipment and comprising:

an array of memory cells arranged in the plurality of rows, each memory cell including a floating gate avalanche injection transistor, a plurality of word lines each connected to a respective row of said memory cells,
each of said word lines having associated therewith a respective driver circuit; said driver circuit comprising
a transistor having a first conductive electrode, a second conductive electrode, and a control electrode,
an output connected to said first conductive electrode,
means for applying a signal pulse of a predetermined polarity to said second conductive electrode, and
selectably operable means conditioned either to a first state for clamping the voltage of said control electrode to cut off said transistor and thereby to maintain said first conductive electrode and said output at a first predetermined voltage level, or to a second state for unclamping the voltage of said control electrode to permit the voltage of said first conductive electrode to swing in the direction of said predetermined polarity in response to said signal pulse;
each of said driver circuit outputs being drivingly connected to the respective word line.

19. A memory system for digital computers and other digital equipment and comprising:
an array of memory cells arranged in a plurality of rows,
each memory cell including a floating gate avalanche injection transistor,
a plurality of word lines each connected to a respective row of said memory cells,
each of said word lines having associated therewith a respective driver circuit; said driver circuit comprising
a transistor having a first conductive electrode, a second conductive electrode, and a control electrode,
an output connected to said first conductive electrode,
means for applying a signal pulse of a predetermined polarity to said second conductive electrode,
selectably operable means conditioned either to a first state for clamping the voltage of said control electrode to cut off said transistor and thereby to maintain said first conductive electrode and said output at a first predetermined voltage level, or to a second state for unclamping the voltage of said control electrode to permit the voltage of said first conductive electrode to swing in the direction of said predetermined polarity in response to said signal pulse;
said selectably operable means comprising
a second transistor having a third conductive electrode, a fourth conductive electrode, and a second control electrode,
a fixed potential source,
means connecting said third conductive electrode to said fixed potential source,
means connecting said fourth conductive electrode to said first-recited control electrode, and
means for selectably applying a signal to said second control electrode to render said second transistor either conductive or non-conductive; and
means for applying a restore pulse to charge said control electrode to an intial voltage level before activation of said signal pulse applying means,
each of said driver circuit outputs being drivingly connected to the respective word line,
said array of memory cells in said driver circuits associated therewith being embodied in a single monolithic integrated circuit chip.

20. A memory system for digital computers and other digital equipment and comprising:
an array of memory cells arranged in a plurality of rows,
each memory cell including a floating gate avalanche injection transistor,
a plurality of word lines each connected to a respective row of said memory cells,
each of said word lines having associated therewith a respective driver circuit; said driver circuit comprising
a high voltage integrated driver circuit comprising
a transistor having a first conductive electrode, a second conductive electrode, and a control electrode,
an output connected to said first conductive electrode,
means for applying a signal pulse of a predetermined polarity to said second conductive electrode, and
selectably operable means conditioned either to a first state for clamping the voltage of said control electrode to cut off said transistor and thereby maintain said first conductive electrode and said output at a first predetermined voltage, or to a second state for unclamping the voltage of said control electrode to permit the voltage of said first conductive electrode to swing in the direction of said predetermined polarity in response to said signal pulse;
said selectably operable means comprising
a second transistor having a third conductive electrode, a fourth conductive electrode, and a second control electrode,
a fixed potential source,
means connecting said third conductive electrode to said fixed potential source,
means connecting said fourth conductive electrode to said first-recited control electrode, and
means for selectably applying a signal to said second control electrode to render said second transistor either conductive or non-conductive;
said first-recited transistor and said second transistor being field effect transistors,
said first and third conductive electrodes being source electrodes,
said second and fourth conductive electrodes being drain electrodes, and said control electrodes being gate electrodes,
each of said driver circuit outputs being drivingly connected to the respective word line.

* * * * *